United States Patent
Umemoto et al.

[19]

[11] Patent Number: 5,877,626
[45] Date of Patent: Mar. 2, 1999

[54] TEMPERATURE RESISTANT MAGNETORESISTANCE SENSING DEVICE

[75] Inventors: Hideki Umemoto; Naoki Hiraoka; Wataru Fukui; Yutaka Ohashi; Masahiro Yokotani, all of Tokyo, Japan

[73] Assignee: Mitsubishi Denki Kabushiki Kaisha, Tokyo, Japan

[21] Appl. No.: 739,048

[22] Filed: Oct. 28, 1996

[30] Foreign Application Priority Data

May 30, 1996 [JP] Japan ................................. 8-136798

[51] Int. Cl.$^6$ ............................. G01B 7/14; G01B 7/30; G01R 33/06; F02B 53/06
[52] U.S. Cl. ................................. 324/207.21; 324/207.12; 324/235
[58] Field of Search ......................... 324/207.21, 207.2, 324/207.12, 207.24, 207.25, 235, 225, 251, 252; 338/32 R, 32 H; 327/510, 511, 512, 513

[56] References Cited

U.S. PATENT DOCUMENTS 3,622,898  11/1971  Salmon ................................. 324/251
5,483,162  1/1996   Ushikoshi et al. ..................... 324/252

OTHER PUBLICATIONS

"Magnetoresistance of Multilayers" by H. Yamamoto et al, vol. 15, No. 5, 1991, *Journal of Magnetics Society of Japan* (no translation).

*Primary Examiner*—Walter E. Snow
*Attorney, Agent, or Firm*—Sughrue, Mion, Zinn, Macpeak & Seas, PLLC

[57] ABSTRACT

The invention provides a sensing device capable of outputting a correct signal precisely corresponding to a particular position (angle) such as a protruding or recessed portion of a rotating member made of a magnetic material over the entire operating temperature range regardless of the temperature coefficient of the magnetic field sensing element. The sensing device includes: a magnet for generating a magnetic field; a rotary member of magnetic material for changing the magnetic field generated by the magnet, the rotary member being disposed at a predetermined distance apart from the magnet; a giant magnetoresistance device which changes in resistance in response to the magnetic field whose magnitude is changed by the rotary member of magnetic material; and an AC coupling circuit for performing an AC coupling process on the output of signal of the giant magnetoresistance device.

12 Claims, 14 Drawing Sheets

FIG. 4(b) OUTPUT OF THE DIFFRENTIAL AMPLIFIER

FIG. 4(c) OUTPUT OF THE AC COUPLING CIRCUIT

FIG. 4(d) OUTPUT OF THE WAVEFORM SHAPING CIRCUIT

FIG. 5(a) OUTPUT OF THE DIFFRENTIAL AMPLIFIER

FIG. 5(b) OUTPUT OF THE AC COUPLING CIRCUIT

FIG. 5(d) OUTPUT OF THE WAVEFORM SHAPING CIRCUIT

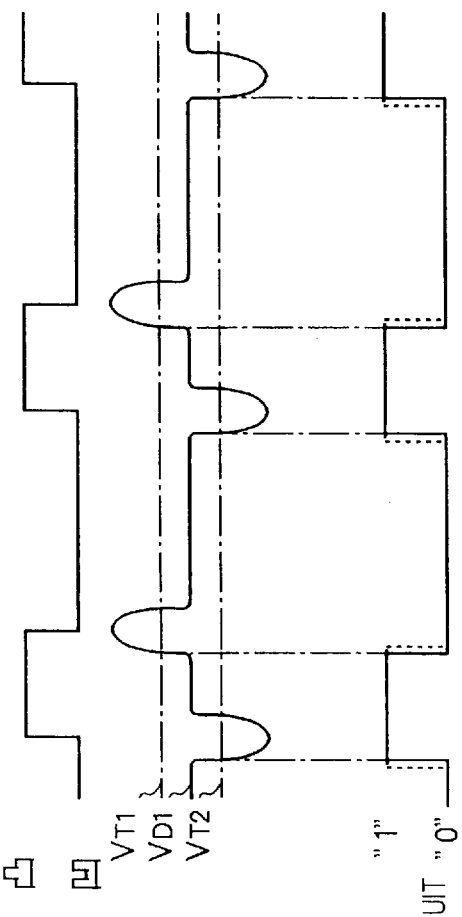

TEMPERATURE RESISTANT MAGNETORESISTANCE SENSING DEVICE

BACKGROUND OF THE INVENTION

1. Field of the Invention

The present invention relates to a sensing device for detecting the change in magnetic field caused by the motion of a moving member of magnetic material, and more particularly, to a sensing device which is particularly suitable for detecting the information about the rotation of for example an internal combustion engine.

2. Description of the Related Art

Magnetoresistance devices generally refer to those devices which change in resistance in response to the direction of a magnetic field applied to a thin ferromagnetic film with respect to the direction of a current flowing through the thin ferromagnetic film.

Magnetoresistance devices have minimum resistance when a magnetic field is applied in a direction at a right angle to the direction of current. On the other hand, when the angle between the direction of the current and the direction of the applied magnetic field is 0, that is when a magnetic field is applied in a direction same as or opposite to the direction of current, the resistance has a maximum value. The change in the resistance is generally called the magnetoresistance effect, and the magnitude of the change in the resistance is referred to as the magnetoresistance variation ratio. A typical value of magnetoresistance variation ratio is 2 to 3% for Ni-Fe and 5 to 6% for Ni-Co.

FIG. 20 is a schematic diagram illustrating the construction of a conventional sensing device, wherein its side view and perspective view are shown in FIG. 20a and FIG. 20b, respectively.

The sensing device shown in FIG. 20 includes: a rotating shaft 1; a rotary member of magnetic material 2 having at least one protruding or recessed portion wherein the rotary member of magnetic material 2 is adapted to rotate in synchronization with the rotation of the rotating shaft 1; a magnetoresistance device 3 disposed at a location a predetermined distance apart from the rotary member of magnetic material 2; and a magnet 4 for applying a magnetic field to the magnetoresistance device 3. In the above construction, the magnetoresistance device 3 includes a magnetoresistance pattern 3a and a thin film surface (magnetic field sensing plane) 3b.

If the rotary member of magnetic material 2 rotates, the magnetic field applied to the magnetic field sensing plane 3b of the magnetoresistance device 3 changes in response to the rotation of the rotary member of magnetic material 2, and, as a result, the resistance of the magnetoresistance pattern 3a changes correspondingly.

FIG. 21 is a block diagram illustrating the construction of the sensing device using the magnetoresistance devices described above.

The sensing device includes: a Wheatstone bridge circuit 11 including magnetoresistance devices disposed at a predetermined distance apart from the rotary member of magnetic material 2 so that a magnetic field is applied from a magnet 4 to the magnetoresistance devices; a differential amplifier 12 for amplifying the output signal of the Wheatstone bridge circuit 11; a comparator 13 for comparing the output of the differential amplifier 12 with a reference values $V_{T1}$, $V_{T2}$ and outputting a "0" signal or a "1" signal depending on the comparison result; a waveform shaping circuit 14 for shaping the waveform of the output of the comparator 13 and supplying a "0" or "1" signal having a sharp rising and falling edges to the output terminal 15.

The operation will be described below with reference to FIG. 22.

If the rotary member of magnetic material 2 rotates, the magnetic field applied to each of the magnetoresistance devices changes in response to the passage of the protruding and recessed portions of the rotary member of magnetic material 2 as shown in FIG. 22a. As a result, the above change in the magnetic field is detected by the magnetoresistance devices, mid-point voltages) of the Wheatstone bridge circuit 11 also change in a similar fashion.

The difference between the mid-point voltages is amplified by the differential amplifier 12. Thus, as shown in FIG. 22b, the differential amplifier 12 outputs a signal $V_{D0}$ corresponding to the passage of the protruding and recessed portions of the rotary member of magnetic material 2 shown in FIG. 22a.

The comparator 13 compares the output signal $V_{D0}$ of the differential amplifier 12 with the reference values $V_{T1}$, $V_{T2}$ and outputs a "0" or "1" signal in response to the comparison result. The output signal of the comparator 13 is shaped by the waveform shaping circuit 14 so that a "0" or "1" output signal having sharp rising and falling edges is provided to the output terminal 15 as shown in FIG. 22c.

However, the conventional sensing device having the above construction has the problem that the change in characteristics with temperature can result in degradation in accuracy in the detected signal and deviation can occur in the output signal relative to the location of the protruding and recessed portions of the rotating member of magnetic material.

That is, MR devices broadly employed in conventional sensing devices have a large temperature coefficient compared with usual resistors, and thus exhibit a great change in resistance with temperature. Furthermore, the temperature coefficient itself changes with resistance, that is, the temperature coefficient when the MR device has a maximum resistance is different from that obtained when the MR device has a minimum resistance. More specifically, while usual resistors typically have a rather small temperature coefficient in the range from 300 to 400 ppm/°C., the temperature coefficient of the MR devices is as great as about 2500 ppm/°C. for the maximum resistance condition and about 2700 ppm/°C. for the minimum resistance condition.

Therefore, if the Wheatstone bridge circuit 11 is constructed with MR devices as shown in FIG. 21, the mid-point voltage of the Wheatstone circuit 11 changes in response not only to the change in resistance of the MR devices caused by the change in magnetic field but also to the temperature coefficients of the MR devices. Furthermore, the difference in the temperature coefficient among the MR devices constituting the bridge circuit also produces a change in the mid-point voltage.

For example, if the characteristic shown in FIG. 22 at an ambient temperature of $T_0$ (for example room temperature) changes due to an increase in the ambient temperature from $T_0$ to $T_1$, a great difference can occur between the voltages of mid-points of the Wheatstone bridge circuit 11. This difference results, as shown in FIG. 23b, in a great deviation of the output $V_{D1}$ of the differential amplifier 12 which should correspond to the protruding and recessed portions of the rotating member 2 of magnetic material shown in FIG. 23a.

That is, the output $V_{D1}$ of the differential amplifier 12 at temperature $T_1$ becomes greater than that at temperature $T_0$, or $V_{D1} > VD_0$ and the output $V_{D1}$ is no longer within the allowable range relative to the reference voltages $V_{T1}$, $V_{T2}$. As a result, as shown in FIG. 23c, the output of the waveform shaping circuit 14 also deviates from the correct waveform represented by the broken lines in the figure, and thus the output signal no longer precisely corresponds to the protruding and recessed portions of the rotating member 2 of magnetic material.

It is a general object of the present invention to solve be above problems. More specifically, it is an object of the present invention to provide a sensing device capable of outputting a correct signal precisely corresponding to a particular position (angle) such as a protruding or recessed portion of a rotating member made of a magnetic material over the entire operating temperature range regardless of the temperature coefficient of the magnetic field sensing element.

SUMMARY OF THE INVENTION

According to an aspect of the present invention, there is provided a sensing device including: magnetic field generation means for generating a magnetic field; magnetic field variation inducing means for changing the magnetic field generated by the magnetic field generation means, the magnetic field variation inducing means being disposed a predetermined distance apart from the magnetic field generation means; magnetic field sensing element for detecting the magnetic field changed by the magnetic field variation inducing means; and processing means for performing an AC coupling process on the output signal of the magnetic field sensing element. In this arrangement, it is possible to obtain a final output signal which always precisely corresponds to the change in the magnetic field over the entire operating temperature range regardless of the temperature coefficients of the magnetic field sensing element, and thus it is possible to improve detection accuracy.

In one form of the invention, the processing means includes a bridge circuit, at least one branch of the bridge circuit comprising the magnetic field sensing element; an amplifying circuit for amplifying the differential output signal of the bridge circuit; an AC coupling circuit for performing an AC coupling process on the output of the amplifying circuit; and means for comparing the output of said AC coupling circuit with a reference voltage. According to this arrangement, it is possible to obtain a final output signal which always precisely corresponds to the change in the magnetic field over the entire operating temperature range regardless of the temperature coefficients of the magnetic field sensing element constituting the bridge circuit, and thus it is possible to further improve detection accuracy.

In another form of the invention, the sensing device includes means for setting the reference voltage of said AC coupling circuit. According to the above arrangement, it is possible to precisely perform an AC coupling process.

In a further form of the invention, the magnetic field variation inducing means is composed of a moving member of magnetic material provided with at least one protruding or recessed portion. In this arrangement, it is possible to obtain a final output signal which always precisely corresponds to protruding and recessed portions of the rotating member of magnetic material, over the entire operating temperature range regardless of the temperature coefficients of the magnetic field sensing element, and thus it is possible to further improve detection accuracy.

In a still further form of the invention, the magnetic field generation means and the magnetic field variation inducing means are formed into a moving member of magnetic material provided with at least one magnetic pole so that the moving member of magnetic material generates a magnetic field and changes the magnetic field. In this arrangement, it becomes possible to start providing a correct output signal precisely corresponding to the location of the magnetic pole of the magnet provided on the moving member of magnetic material as soon as the power of the sensing device is turned on without incurring any influence of the change in temperature.

In a yet further form of the invention, the moving member of magnetic material is a rotary member which rotates in synchronization with a rotating shaft. This arrangement ensures that the sensing device can precisely detect the change in the magnetic field caused by the rotation of the rotary member of magnetic material without incurring any influence of the change in temperature.

In a still another form of the invention, the sensing device includes a main part of the sensing device provided with at least a giant magnetoresistance device, the rotary member being mounted on a crank shaft or a cam shaft on an internal combustion engine, the main part of the sensing device being disposed adjacent to the internal combustion engine so that the rotary member faces the giant magnetoresistance device. This arrangement makes it possible to achieve a small-sized and high-precision sensing device which can precisely detect the rotation angle (rotation speed) of the crank shaft or the cam shaft of an internal combustion engine without incurring any influence of the change in temperature. As a result, it becomes possible to precisely control the internal combustion engine. Furthermore, the sensing device can be easily mounted in a highly reliable fashion on an internal combustion engine without requiring a large mounting space.

In a still another form of the invention, the main part of the detecting apparatus is disposed at a location shifted from the rotary member in a direction along the rotation axis of the rotating shaft. In this arrangement, the space near the rotating shaft can be effectively utilized to install the main part of the sensing device. This means that no additional space in a radial direction is required to install the main part of the sensing device, and therefore it is possible to further reduce the size of the sensing device.

In a still another form of the invention, the main part of the detecting apparatus includes a housing in which at least the magnetic field sensing elements is disposed, and the rotary member is disposed in a space on a side of the housing in such a manner that at least the periphery of the rotary member faces the magnetic field sensing element. In this arrangement, a magnetic path is formed through the rotary member and the magnetic field sensing element. Therefore, this structure has,in effect,the same function as the rotary member of magnetic material at least a part of which is formed of a magnet. As a result, in this structure, it becomes possible to start providing a correct output signal precisely corresponding to the rotation angle of the rotary member as soon as the power of the sensing device is turned on without incurring any influence of the change in temperature.

BRIEF DESCRIPTION OF THE DRAWINGS

FIGS. 4(a)–4(d) are waveform diagrams illustrating the operation relating to FIG. 3;

FIGS. 5(a)–5(d) are waveform diagrams illustrating the operation relating to FIG. 4;

FIGS. 23(a)–23(c) are waveform diagrams illustrating the operation relating to FIG. 21.

DESCRIPTION OF THE PREFERRED EMBODIMENTS

With reference to preferred embodiments, the sensing device according to the present invention will be described in greater detail below in connection with the accompanying drawings.

Embodiment 1

Figure 1A:
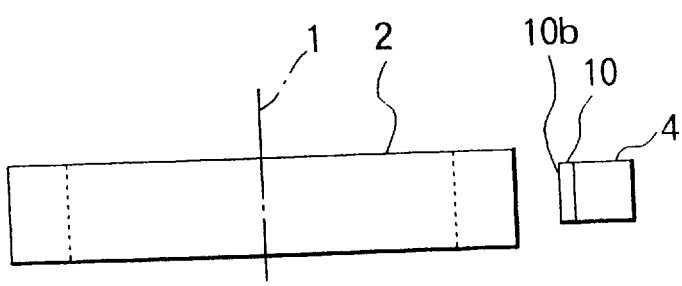
FIGS. 1(a) and 1(b) are schematic diagrams illustrating a first embodiment of a sensing device according to the present invention.
Figure 1B:
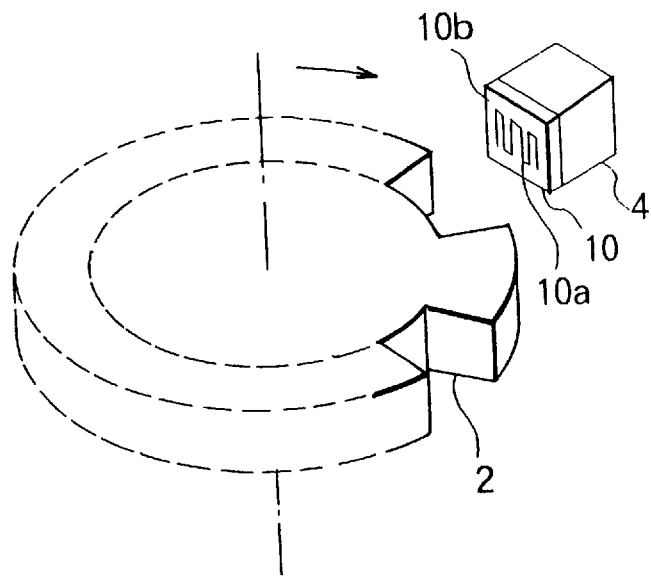

FIG. 1 is a schematic diagram illustrating a first embodiment of a sensing device according to the present invention, wherein FIGS. 1a and 1b are a side view and a perspective view thereof, respectively.

The sensing device includes: a rotating shaft 1; a rotary member of magnetic material 2 serving as magnetic field variation inducing means, the rotary member of magnetic material 2 having at least one protruding or recessed portion, the rotary member of magnetic material 2 being adapted to rotate in synchronization with the rotation of the rotating shaft 1; a magnetic field sensing element, for example, a giant magnetoresistance device 10 disposed in a radial direction of the rotary member of magnetic material 2 at a location a predetermined distance apart from the rotary member of magnetic material 2; and a magnet 4 serving as magnetic field generating means for supplying a magnetic field to the giant magnetoresistance device 10, wherein the giant magnetoresistance device 10 includes a magnetoresistance pattern 10a serving as a magnetic field sensing pattern and a thin film plane (magnetic field sensing plane) 10b.

If the rotary member of magnetic material 2 rotates, the magnetic field applied to the magnetic field sensing plane 10b of the giant magnetoresistance device 10 changes, and thus the resistance of the magnetoresistance pattern 10a changes correspondingly.

In this sensing device, the giant magnetoresistance device 10 has a multilayer structure consisting of alternately grown magnetic layers and non-magnetic layers each having a thickness in the range from a few A to a few tens of A. Such a multilayer structure is known as the superlattice structure, and a specific example is disclosed in a paper entitled "Magnetoresistance effect of superlattice" published in the Journal of Magnetics Society of Japan, Vol. 15, No. 51991, pp. 813 to 821. Specific structures includes (Fe/Cr)n, (permalloy/Cu/Co/Cu)n, (Co/Cu)n, etc. These superlattice structures exhibit much greater magnetoresistance effect (giant magnetoresistance effect) than conventional magnetoresistance devices. In these giant magnetoresistance devices with superlattice structure, the magnetoresistance effect depends only on the relative angle between magnetization of adjacent magnetic layers, and therefore the change in resistance does not depend on the direction of the external magnetic field applied with respect to the direction of current (this property is referred to as "in-plane magnetic field sensitivity). A temperature coefficient of the GMR device is also as great as about 800 to 900 ppm/°C. for the maximum resistance condition and about 1400 to 1500 ppm/°C. for the minimum resistance condition, so there is a great difference in the temperature coefficient therebetween.

In view of the above, in the present invention, the magnetic field sensing plane for detecting the change in the magnetic field is formed substantially with giant magnetoresistance devices 10 wherein electrodes are formed so that the respective giant magnetoresistance devices are connected in such a manner as to form a bridge circuit. Two opposite nodes of the bridge circuit is connected to a constant voltage source or a constant current source so that the change in resistance of the giant magnetoresistance devices 10 is converted into the change in voltage thereby detecting the change in the magnetic field applied to the giant magnetoresistance devices 10.

Figure 2:
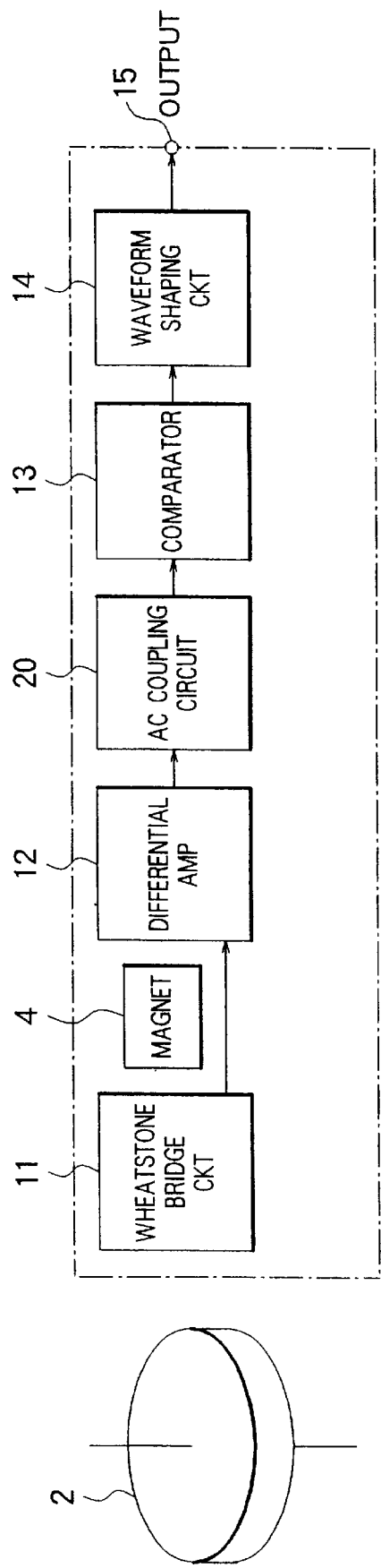
FIG. 2 is a block diagram illustrating the circuit configuration of the first embodiment of the sensing device according to the present invention.

FIG. 2 is a block diagram illustrating the construction of the sensing device using the giant magnetoresistance devices described above.

The sensing device includes: a Wheatstone bridge circuit 11A including giant magnetoresistance devices disposed at a predetermined distance apart from the rotary member of magnetic material 2 so that a magnetic field is applied from a magnet 4 to the giant magnetoresistance devices; a differential amplifier 12 for amplifying the output signal of the Wheatstone bridge circuit 11A; an AC coupling circuit 20 for blocking the DC component of the output of the differential amplifier 12, a comparator 13 for comparing the output of the AC coupling circuit 20 with a reference value and outputting a "0" signal or a "1" signal depending on the comparison result; a waveform shaping circuit 14 for shaping the waveform of the output of the comparator 13 and supplying a "0" or "1" signal having a sharp rising and falling edges to the output terminal 15. The above differential amplifier 12, comparator 13, and waveform shaping circuit 14 form signal processing means.

Figure 3:
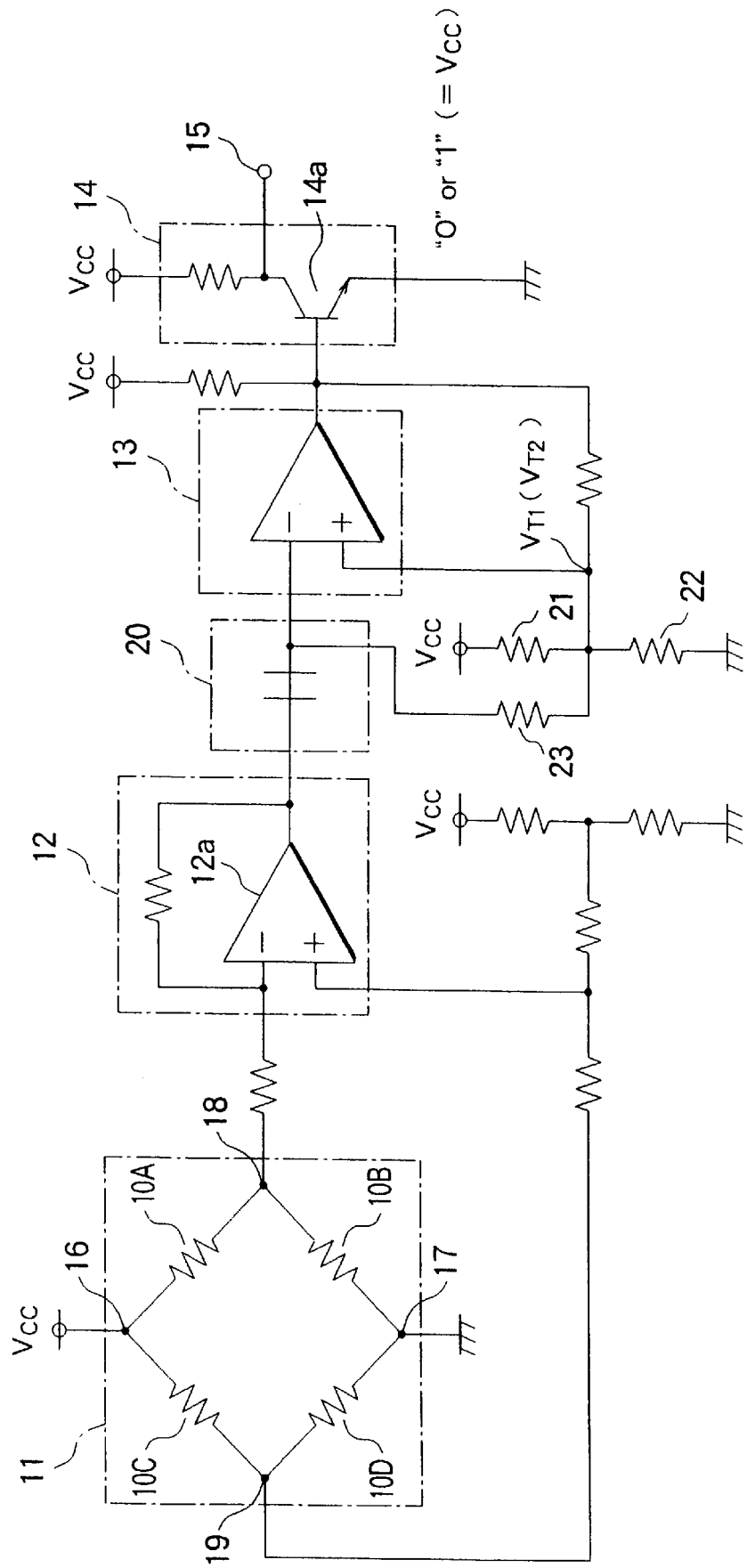
FIG. 3 is a circuit diagram illustrating a specific example of the circuit of FIG. 2.

FIG. 3 is a circuit diagram illustrating a specific example of the circuit shown in FIG. 2.

The Wheatstone bridge circuit 11A includes branches 10A, 10B, 10C, and 10D which are each formed with a giant magnetoresistance device. One end of the giant magnetoresistance device 10A and one end of the giant magnetoresistance device 10C are connected in common to each other, and the node 16 between these devices 10A and 10C is connected to the power supply terminal Vcc. One end of the giant magnetoresistance device 10B and one end of the giant magnetoresistance device 10D are connected in common to each other, and the node 17 between these devices 10B and 10D is grounded. The other ends of the giant magnetoresistance devices 10A and 10B are connected to a node 18, while the other ends of the giant magnetoresistance devices 10C and 10D are connected to a node 19.

The node 18 of the Wheatstone bridge circuit 11A is connected, via a resistor, to the inverting input of the amplifier 12a constituting the differential amplifier 12. The node 19 is connected, via a resistor, to the non-inverting input of the amplifier 12a wherein the non-inverting input of the amplifier 12a is further connected, via a resistor, to a voltage divider constituting a reference power supply. The output terminal of the amplifier 12a is connected to the inverting input terminal of the comparator 13 through the AC coupling circuit 20 using for example capacitor. The non-inverting input terminal of the comparator 13 is connected to a voltage divider constituting a reference power supply which is composed of resistors 21 and 22, and also connected via a resistor to the output terminal of the comparator 13. A node between the resistors 21 and 22 is connected to the non-inverting input terminal of the comparator 13 through a resistor 23. These resistors 21 to 23 constitute a means for setting the reference voltage of the AC coupling circuit 20.

The output of the comparator 13 is also connected to the base of a transistor 14a. The collector of the transistor 14a is connected to the output terminal 15 and also to a power supply terminal Vcc via a resistor. The emitter of the transistor 14a is grounded.

The operation at an ambient temperature of To will be firstly described below with reference to FIG. 4.

Figure 4A:
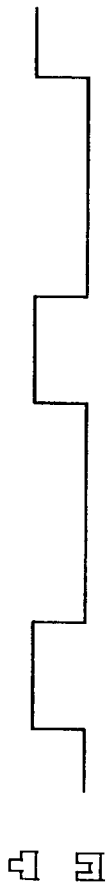
Figure 4A:
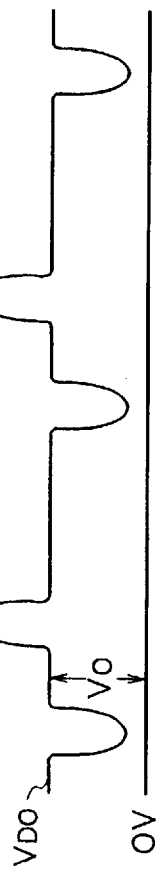
Figure 4A:
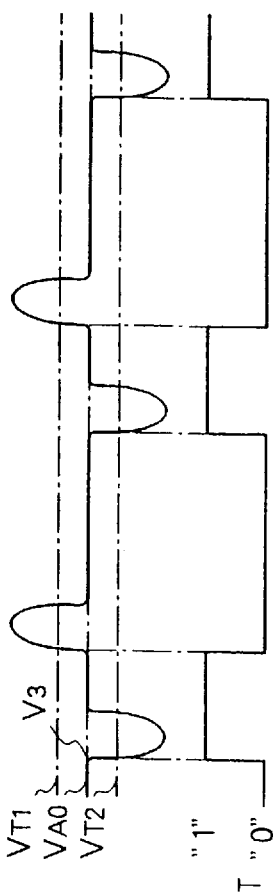
Figure 4A:
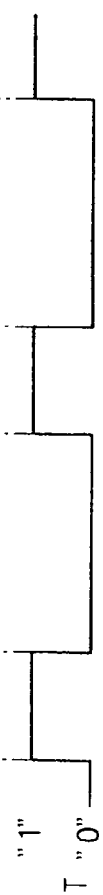

If the rotary member of magnetic material 2 rotates, the magnetic field applied to the giant magnetoresistance devices 10A to 10D changes in response to the passage of the protruding and recessed portions of the rotary member of magnetic material 2 as shown in FIG. 4a, wherein the magnetic field applied to the magnetoresistance devices 10A and 10D is, in effect, opposite in phase to that applied to the magnetoresistance devices 10B and 10C. The above change in the magnetic field is detected by the magnetoresistance devices 10A and 10D, and also by the magnetoresistance devices 10B and 10C wherein the phase of the magnetic field detected by the magnetoresistance devices 10A and 10D becomes opposite to that detected by the magnetoresistance devices 10B and 10C. As a result, the overall magnitude of the change in the magnetic field becomes, in effect, four times greater than that which can be sensed by a single giant magnetoresistance device.

A corresponding change in resistance occurs in each giant magnetoresistance device. Thus, the giant magnetoresistance devices 10A and 10D have maximum and minimum resistances at locations opposite in phase to those where the giant magnetoresistance elements 10B and 10C have maximum and minimum resistances. As a result, the voltages at the nodes 18 and 19 (mid-point voltages) of the Wheatstone bridge circuit 11A also change in a similar fashion.

The difference between the mid-point voltages is amplified by the differential amplifier 12. Thus, as shown in FIG. 4b, the differential amplifier 12 outputs a signal $V_{D0}$ corresponding to the passage of the protruding and recessed portions of the rotary member of magnetic material 2 shown in FIG. 4a. The output signal of the differential amplifier 12 is substantially four times greater than can be obtained by a single giant magnetoresistance device.

The DC component (offset component) Vo of the output of the differential amplifier 12 is blocked by the AC coupling circuit 20, and thus the resultant output $V_{A0}$ includes only an AC component as shown in FIG. 4c. In FIG. 4c, $V_3$ denotes the reference voltage of the AC coupling circuit 20, wherein $V_3$ is substantially equal to 0 V. The output voltage $V_{A0}$ of the AC coupling circuit 20 is supplied to the comparator 13 so as make a comparison with the reference values or the comparison reference levels $V_{T1}$ and $V_{T2}$. The comparator 13 outputs a "0" or "1" signal in accordance with the comparison result. This signal is then shaped by the waveform shaping circuit 14 into a "0" or "1" signal having sharp rising and falling edges as shown in FIG. 4d. The resultant signal is finally output via the output terminal 15.

The operation at an ambient temperature of $T_1$ ($>T_0$) will be firstly described below with reference to FIG. 5.

If the rotary member of magnetic material 2 rotates, the magnetic field applied to the giant magnetoresistance devices 10A to 10D changes in response to the passage of the protruding and recessed portions of the rotary member of magnetic material 2 as shown in FIG. 5a, wherein the magnetic field applied to the magnetoresistance devices 10A and 10D is, in effect, opposite in phase to that applied to the magnetoresistance devices 10B and 10C. The above change in the magnetic field is detected by the magnetoresistance devices 10A and 10D, and also by the magnetoresistance devices 10B and 10C wherein the phase of the magnetic field detected by the magnetoresistance devices 10A and 10D becomes opposite to that detected by the magnetoresistance devices 10B and 10C. As a result, the overall magnitude of the change in the magnetic field becomes, in effect, four times greater than that which can be sensed by a single giant magnetoresistance device.

A corresponding change in resistance occurs in each giant magnetoresistance device. Thus, the giant magnetoresistance devices 10A and 10D have maximum and minimum resistances at locations opposite in phase to those where the giant magnetoresistance elements 10B and 10C have maximum and minimum resistances. As a result, the voltages at the nodes 18 and 19 (mid-point voltages) of the Wheatstone bridge circuit 11A also change in a similar fashion.

The difference between the mid-point voltages is amplified by the differential amplifier 12. Thus, as shown in FIG. 5b, the differential amplifier 12 outputs a signal $V_{D1}$ corresponding to the passage of the protruding and recessed portions of the rotary member of magnetic material 2 shown in FIG. 5a. The output signal of the differential amplifier 12 is substantially four times greater than can be obtained by a single giant magnetoresistance device.

Figure 5C:
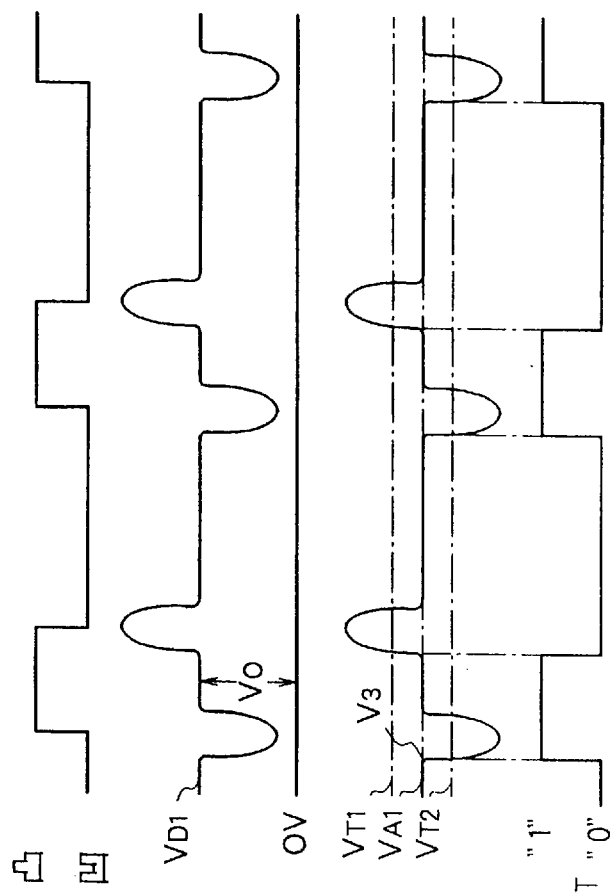

The DC component (offset component) $V_1$ ($>V_0$) of the output of the differential amplifier 12 is blocked by the AC coupling circuit 20, and thus the resultant output $V_{A1}$ includes only an AC component as shown in FIG. 5c. In FIG. 5c, $V_3$ denotes the reference voltage of the AC coupling circuit 20, wherein $V_3$ is substantially equal to 0 V. The output voltage $V_{A1}$ of the AC coupling circuit 20 is supplied to the comparator 13 so as make a comparison with the reference values or the comparison reference levels $V_{T1}$ and $V_{T2}$. The comparator 13 outputs a "0" or "1" signal in accordance with the comparison result. This signal is then shaped by the waveform shaping circuit 14 into a "0" or "1" signal having sharp rising and falling edges as shown in FIG. 5d. The resultant signal is finally output via the output terminal 15.

As described above, the output of the differential amplifier 12 for amplifying the differential output signal of the Whetstone bridge circuit 11A is coupled to the input of the comparator 13 via the AC coupling circuit 20, and therefore even if the output voltage of the differential amplifier 12 greatly differs from the value at temperature $T_0$ to the value at temperature $T_1$ as shown in FIGS. 4 and 5 in response to an event of a great difference between the voltages at the mid-points 18 and 19 owing to the large temperature coefficient of the GMR device, that is, even if the output voltage of the differential amplifier 12 at temperature $T_1$ becomes greater than that at temperature $T_0$, or $V_{D1}>V_{D0}$, the above change in the output signal is eliminated since the DC component (offset component) is blocked by the AC coupling circuit 20. As a result, the voltage at the input terminal of the comparator 13 is always maintained at the center between the reference values or the comparison reference levels $V_{T1}$ and $V_{T2}$ regardless of the above-described change.

Therefore, as shown in FIGS. 4 and 5, the output of the waveform shaping circuit 14 is also maintained within the correct range, and thus the final output voltage precisely corresponds to the protruding and recessed portions of the rotating member 2 of magnetic material.

Although the Wheatstone bridge circuit constructed with GMR devices is employed in this specific embodiment, other similar bridge circuit configurations may also be employed.

In the present embodiment, as described above, the signal detected by the GMR devices is processed after passing it through the AC coupling circuit so as to obtain a final output signal which always precisely corresponds to the protruding and recessed portions of the rotating member of magnetic material over the entire operating temperature range regardless of the temperature coefficients of the GMR devices constituting the bridge circuit.

Embodiment 2

Figure 6:
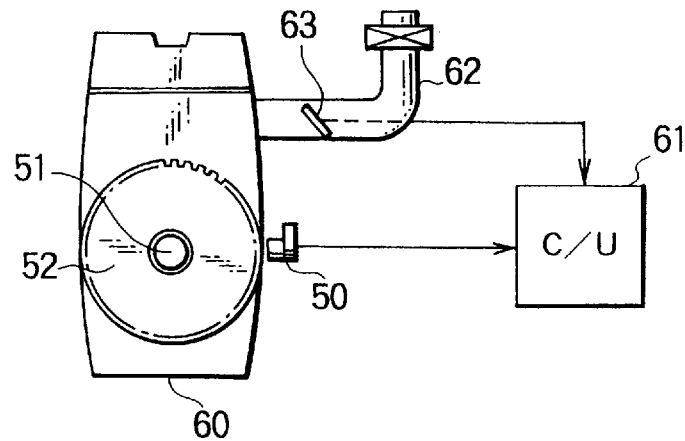
FIG. 6 is a schematic diagram illustrating a second embodiment of a sensing device according to the present invention.
Figure 7:
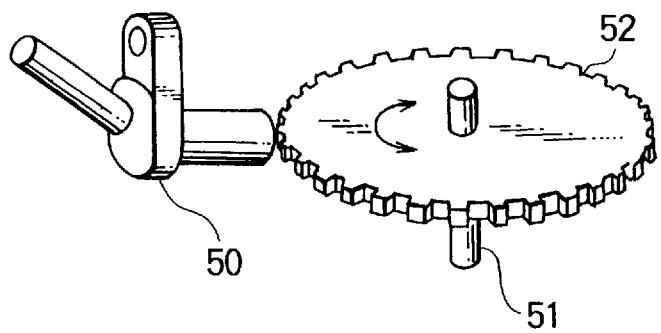
FIG. 7 is a perspective view illustrating the relative positions of the main part of the sensing device and a rotary member of magnetic material in the second embodiment according to the present invention.
Figure 8:
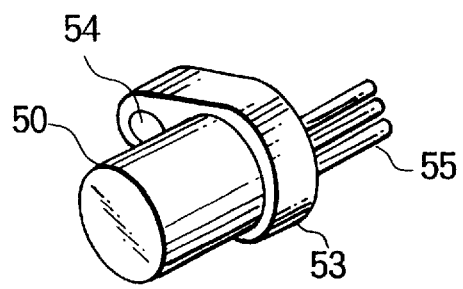
FIG. 8 is a perspective view illustrating the main part of the sensing device of the second embodiment according to the present invention.
Figure 9:
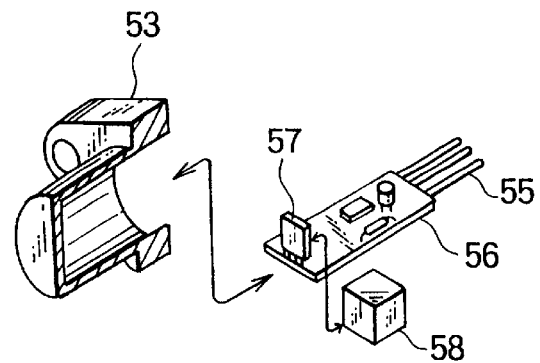
FIG. 9 is an exploded view illustrating the internal structure of the main part of the sensing device of the second embodiment according to the present invention.
Figure 10:
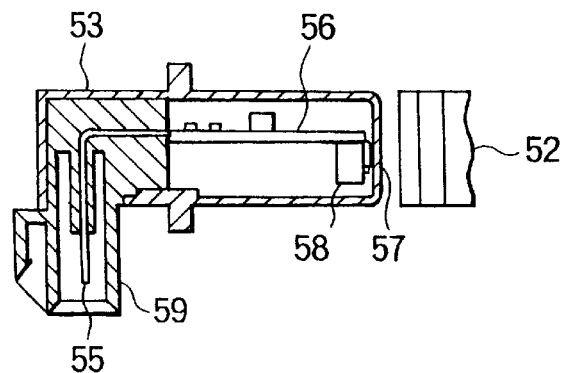
FIG. 10 is a sectional side view illustrating a modified example of the main part of the sensing device based on the second embodiment of the invention.

FIGS. 6 to 9 illustrate an eighth embodiment of the invention, in which the invention is applied to an internal combustion engine. FIG. 6 is a schematic diagram illustrating the construction of the entire system of the embodiment. FIG. 7 is a perspective view illustrating the relative positions of the main part of a sensing device and a rotary member of magnetic material. FIG. 8 is a perspective view illustrating the main part of the sensing device, and FIG. 9 illustrates the internal structure thereof. As shown in these figures, the main part of the sensing device 50 is disposed at a location adjacent to the internal combustion engine 60. A rotary member of magnetic material 52 serving as a signal plate is disposed on a crank shaft or a cam shaft of the engine 60 serving as a rotation shaft 51 so that the rotary member of magnetic material 52 can rotate in synchronization with the rotation shaft 51 wherein the rotary member of magnetic material 52 has at least one protruding or recessed portion as in the above-descried rotary member of magnetic material 2.

A control unit 61 is connected to a circuit unit of the main part of the sensing device 50. The control unit 61 is also connected to a throttle valve disposed in the intake piper 62 of the internal combustion engine 60.

The main part of the sensing device 50 is disposed near the internal combustion engine 60 in such a manner that the magnetic field sensing plane of the giant magnetoresistance devices of the main part of the sensing device 50 faces the rotary member of magnetic material 52.

As shown in FIG. 8, the main part of the sensing device 50 includes: a housing 53 made up of resin or a nonmagnetic material; a fixing part 54; and input/output lead terminals 55 such as a power supply terminal, a ground terminal, and an output terminal, extending from the bottom portion of the housing 53.

As shown in FIG. 9, inside the housing 53 is a substrate 56 on which a circuit such as that described earlier with reference to FIG. 3 is disposed. On the substrate 56, there are also provided giant magnetoresistance devices 57 and a magnet 58 similar to for example the above-descried giant magnetoresistance device 10 and magnet 4, respectively.

The operation will be described below.

If the internal combustion engine 60 is started and thus the rotary member of magnetic material 52 starts to rotate in synchronization with the rotation of the rotating shaft 51, the magnetic field applied to the magnetic field sensing plane of the giant magnetoresistance devices 57 of the main part of the sensing device 50 changes in response to the protruding and recessed portions, and a corresponding change occurs in the resistance of the giant magnetoresistance devices 57. As a result the difference voltage between the mid-point voltages of a Wheatstone bridge circuit including the giant magnetoresistance devices 57 changes correspondingly. The difference voltage is amplified by a differential amplifier, the DC component of the output thereof is blocked by the AC coupling circuit and thus resultant output including an AC component is supplied to a comparator which in turn compares the output signal of the differential amplifier with a reference voltage and outputs a "0" or "1" signal in response to the comparison result. The output signal of the comparator is then shaped by a waveform shaping circuit. The resultant signal having a "0" or "1" level is supplied to the control unit 61. From this signal, it is possible to obtain a final output signal which always precisely corresponds to the protruding and recessed portions of the rotating member 52 of magnetic material over the entire operating temperature range regardless of the temperature coefficients of the GMR devices constituting the bridge circuit, and also the control unit 61 can precisely acquire the information about the rotation angle and the rotation speed of the crank shaft and the cam shaft of each cylinder of the internal combustion engine 60.

On the basis of the output signal of the sensing device, which has either a "0" or a "1" level, and also on the basis of the information about the opening ratio of the throttle valve 63, the control unit 61 generates control signals by which the ignition timing of ignition plugs (not shown) and the injection timing of the fuel injection valves are controlled.

Figure 21:
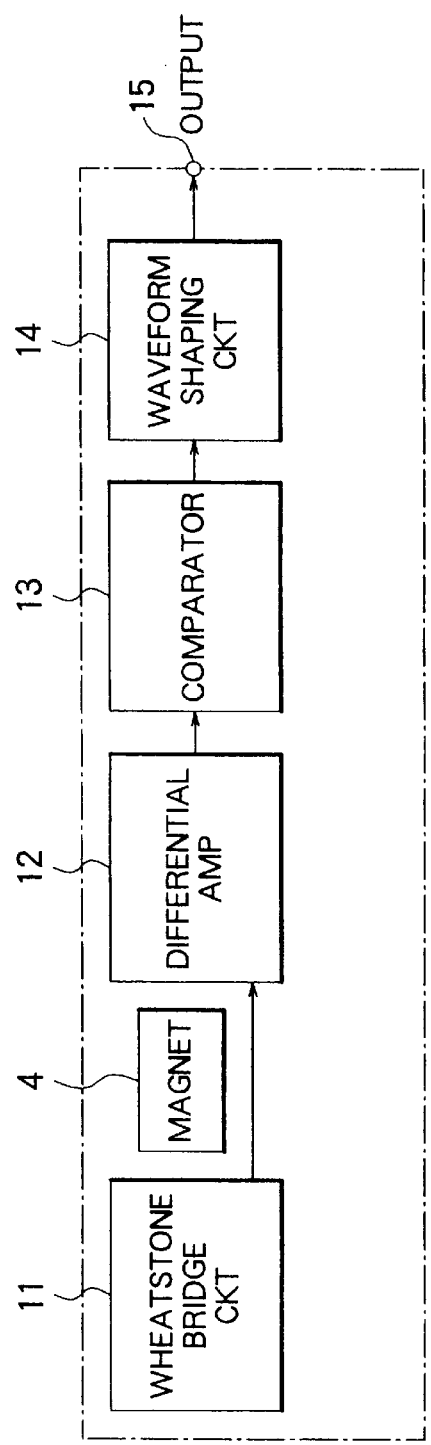
FIG. 21 is a simplified circuit diagram of the conventional sensing device.
Figure 21:
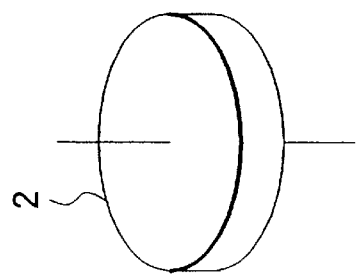
Figures 22A, 22B, 22C:
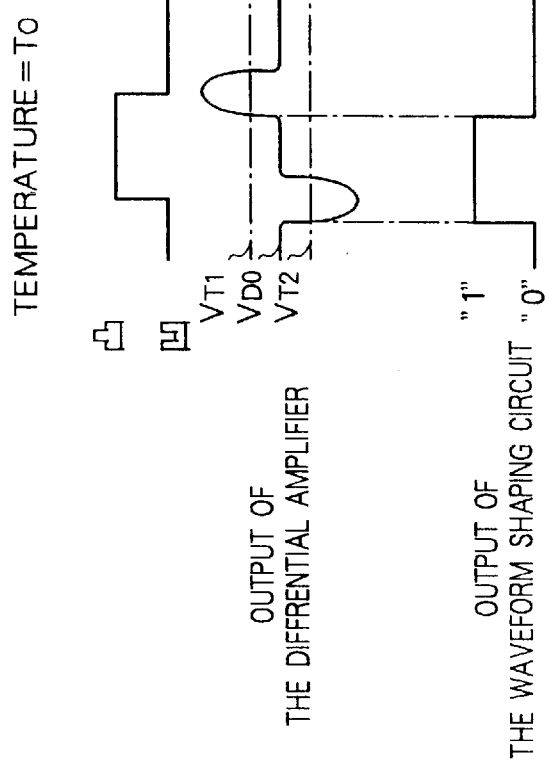
FIGS. 22(a)–22(c) are waveform diagrams illustrating the operation relating to FIG. 21.

Although, in the specific example described above, the main part of the sensing device 50 has input/output terminals 55 in the form of leads, a connector 59 such as that shown in FIG. 21 which can be attached in a removable fashion to the housing 53 may also be employed.

In this case, the terminals 55 are incorporated in the connector 59 so that when the connector 59 is fitted into the housing 53 the terminals 55 come in contact with the circuit disposed on the substrate 56. This connector 59 makes it easy to handle the sensing device with a simple mechanism, and also makes it easy to mount the sensing device on an internal combustion engine.

As described above, the present embodiment provides a small-sized and high-precision sensing device which can precisely detect the rotation angle (rotation speed) of the crank shaft or the cam shaft of an internal combustion engine without incurring any influence of the change in temperature. This makes it possible to precisely control the internal combustion engine. Furthermore, the sensing device of the present embodiment can be easily mounted in a highly reliable fashion on an internal combustion engine without requiring a large mounting space.

Embodiment 3

Figure 11:
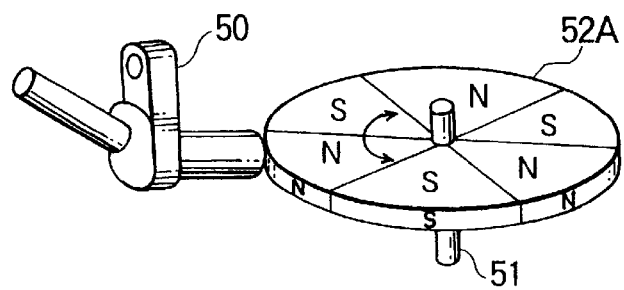
FIG. 11 is a schematic diagram illustrating a third embodiment of a sensing device according to the present invention.
Figure 12:
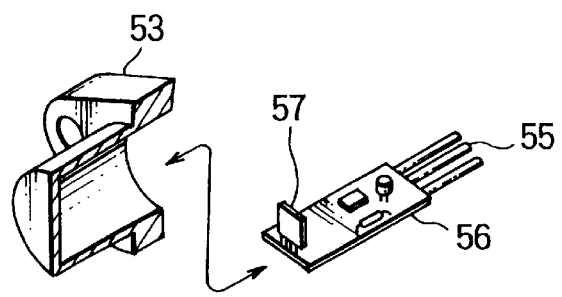
FIG. 12 is an exploded view illustrating the internal structure of the main part of the sensing device of the third embodiment according to the present invention.

FIGS. 11 and 12 illustrate a third embodiment of the present invention in which the invention is also applied to an internal combustion engine. FIG. 11 is a perspective view illustrating the relative positions of the main part of a sensing device and a rotary member of magnetic material. FIG. 12 illustrates the internal structure of the sensing device.

In FIGS. 11 and 12, similar elements and parts to those in FIGS. 7 or 9 are denoted by similar reference numerals, and those are not described here in further detail. The construction of the entire system and the construction of the main part of the sensing device are similar to those shown in FIGS. 6 and 8, respectively.

A rotary member of magnetic material 52A serving as a signal plate is disposed on a crank shaft or a cam shaft of the engine 60 serving as a rotation shaft 51 so that the rotary member of magnetic material 52A can rotate in synchronization with the rotation shaft 51. As in the rotary member of magnetic material 42, the rotary member of magnetic material 52A also consists of magnets which have been produced by means of magnetization so that the rotary member of magnetic material 52A has desired magnetic poles. In this case, therefore, the magnet 58 employed in the embodiment described above in connection with FIG. 9 is no longer required. The other parts are similar to those of FIG. 9.

The main part of the sensing device 50 is disposed near the internal combustion engine 60 (refer to FIG. 6) in such a manner that the magnetic field sensing plane of the giant magnetoresistance devices of the main part of the sensing device 50 faces the rotary member of magnetic material 52A.

The main part of the sensing device 50 includes: a housing 53 made up of resin or a non-magnetic material; a fixing part 54; and input/output lead terminals 55 such as a power supply terminal, a ground terminal, and an output terminal, extending from the bottom portion of the housing 53 (refer to FIG. 8).

Inside the housing 53 is a substrate 56 on which a circuit such as that described earlier with reference to FIG. 3 is disposed. On the substrate 56, there are also provided giant magnetoresistance devices 57 similar to for example the above-descried giant magnetoresistance devices 10.

The operation will be described below.

If the internal combustion engine 60 is started and thus the rotary member of magnetic material 52A starts to rotate in synchronization with the rotation of the rotating shaft 51, the magnetic field applied to the magnetic field sensing plane of the giant magnetoresistance devices 57 of the main part of the sensing device 50 changes in response to the protruding and recessed portions, and a corresponding change occurs in the resistance of the giant magnetoresistance device 57. As a result the difference voltage between the mid-point voltages of a Wheatstone bridge circuit including the giant magnetoresistance devices 57 changes correspondingly. The difference voltage is amplified by a differential amplifier, and the DC component of the output thereof is blocked by the AC coupling circuit and thus resultant output including an AC component is supplied to a comparator which in turn compares the output signal of the differential amplifier with a reference voltage and outputs a "0" or "1" signal in response to the comparison result. The output signal of the comparator is then shaped by a waveform shaping circuit. The resultant signal having a "0" or "1" level is supplied to the control unit 61 (refer to FIG. 6).

From this signal, it is possible to obtain a final output signal which always precisely corresponds to the protruding and recessed portions of the rotating member 52A of magnetic material over the entire operating temperature range regardless of the temperature coefficients of the GMR devices constituting the bridge circuit, and also the control unit 61 can precisely acquire the information about the rotation angle and the rotation speed of the crank shaft and the cam shaft of each cylinder of the internal combustion engine 60.

On the basis of the output signal of the sensing device, which has either a "0" or a "1" level, and also on the basis of the information about the opening ratio of the throttle valve 63, the control unit 61 generates control signals by which the ignition timing of the ignition plugs (not shown) and the injection timing of the fuel injection valves are controlled.

Figure 13:
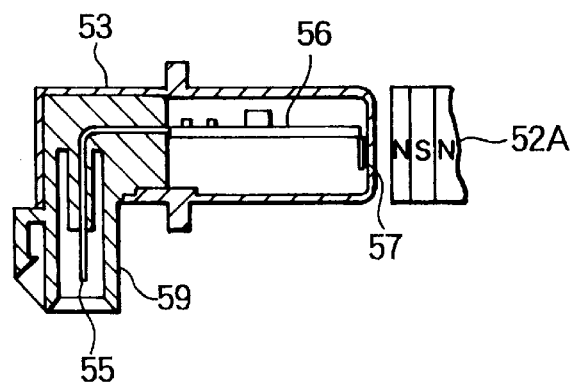
FIG. 13 is a sectional side view illustrating a modified example of the main part of the sensing device based on the third embodiment of the invention.

Although, in the specific example described above, the main part of the sensing device 50 has input/output terminals 55 in the form of leads, a connector 59 such as that shown in FIG. 13 which can be attached in a removable fashion to the housing 53 may also be employed. In this case, the terminals 55 are incorporated in the connector 59 so that when the connector 59 is fitted into the housing 53 the terminals 55 come in contact with the circuit disposed on the substrate 56. This connector 59 makes it easy to handle the sensing device with a simple mechanism, and also makes it easy to mount the sensing device on an internal combustion engine.

As described above, the present embodiment also can provide a small-sized and high-precision sensing device at a low cost, which can precisely detect the rotation angle (rotation speed) of the crank shaft or the cam shaft of an internal combustion engine without incurring any influence of the change in temperature. This makes it possible to precisely control the internal combustion engine. Furthermore, the sensing device of the present embodiment can be easily mounted in a highly reliable fashion on an internal combustion engine without requiring a large mounting space.

Still furthermore, as soon as the electric power is turned on, the sensing device can start to provide a reliable output signal precisely corresponding to the magnetic poles of the magnets of the rotary member of magnetic material. This makes it possible to detect the crank angle of the internal combustion engine without a delay time, and thus makes it possible to precisely control the ignition timing and the fuel injection timing without a delay time. Thus, this technique makes it possible to achieve an internal combustion engine which satisfies the requirements prescribed by the regulation of exhaust gas.

Embodiment 4

Figure 14A:
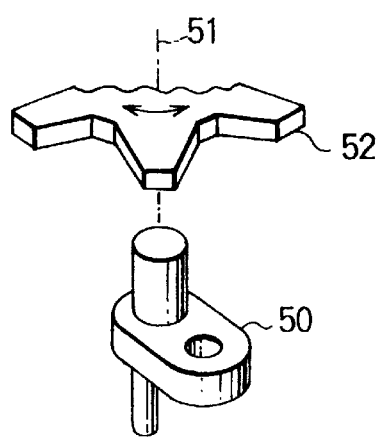
FIG. 14 is a schematic diagram illustrating a fourth embodiment of a sensing device according to the present invention.
Figure 14B:
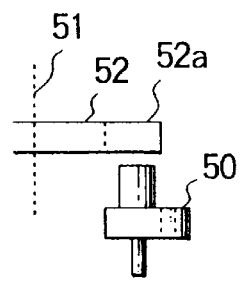

FIG. 14 illustrate a fourth embodiment of the present invention, wherein FIG. 14a is a perspective view illustrating the relative positions of the main part of a sensing device and a rotary member of magnetic material, and FIG. 14b is a side view thereof. In FIG. 14, similar elements and parts to those in FIG. 7 are denoted by similar reference numerals, and they are not described here in further detail.

In all the previous embodiments, the main part of the sensing device is disposed in a position perpendicular to the rotating axis. In contrast, in this tenth embodiment, the main part of the sensing device is disposed in a position parallel to the rotating axis.

That is, as shown in FIG. 14a. the main part of the sensing device 50 is shifted in a direction along the rotating axis 51 so that the magnetic field sensing plane of the giant magnetoresistance device of the main part of the sensing device 50 faces the protruding and recessed portions 52A of the rotary member of magnetic material 52 as in FIG.14b.

The present embodiment provides not only similar effects to those in the second embodiment described above, but also an additional advantage that the space near the rotating shaft can be effectively utilized to dispose the main part of the sensing device. In this arrangement, no additional space in a radial direction is required to install the main part of the sensing device, and therefore it is possible to further reduce the size of the sensing device.

Embodiment 5

Figure 15A:
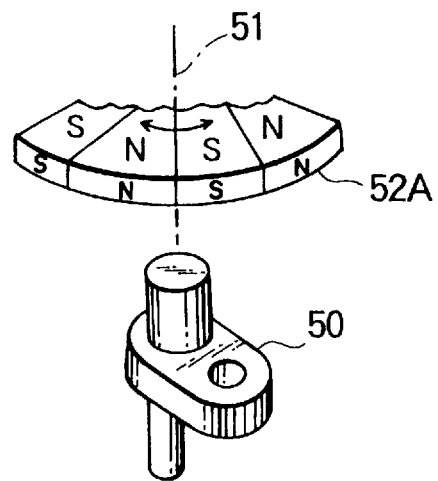
FIG. 15 is a schematic diagram illustrating an fifth embodiment of a sensing device according to the present invention.
Figure 15B:
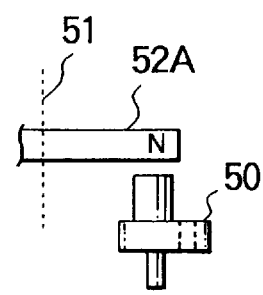

FIG. 15 illustrates an eleventh embodiment of the invention. FIG. 15a is a perspective view illustrating the relative positions of the main part of a sensing device and a rotary member of magnetic material, and FIG. 15b is a side view thereof. In FIG. 15, similar elements and parts to those in FIG. 11 are denoted by similar reference numerals, and they are not described here in further detail.

In this embodiment, as in the fourth embodiment described above, the main part of the sensing device is disposed in a position parallel to the rotating axis.

That is, as shown in FIG. 15a, the main part of the sensing device 50 is disposed in a position parallel to the rotating axis 51 so that the magnetic field sensing plane of the giant magnetoresistance device of the main part of the sensing device 50 faces the magnetic poles of the rotary member of magnetic material 52A.

The present embodiment not only provides similar effects to those in the third embodiment described above, but also provides an additional advantage that the space near the rotating shaft can be effectively utilized to dispose the main part of the sensing device. In this arrangement, thus, no additional space in a radial direction is required to install the main part of the sensing device, and therefore it is possible to further reduce the size of the sensing device. As a matter of course, the rotary member of magnetic material 52A may be replaced by the rotary member of magnetic material 41 provided with the magnet 40.

Embodiment 6

Figure 16:
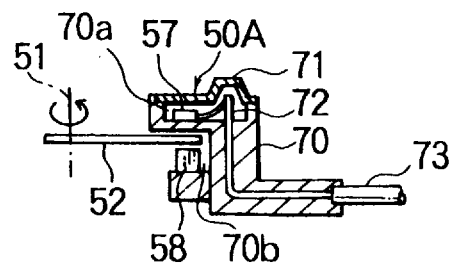
FIG. 16 is a sectional side view illustrating a sixth embodiment of a sensing device according to the present invention.
Figure 17:
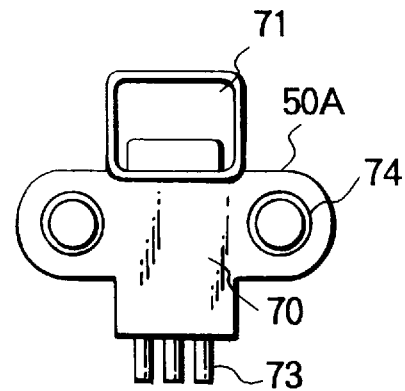
FIG. 17 is a perspective view illustrating the main part of the sensing device of the twelfth embodiment according to the present invention.

FIGS. 16 and 17 illustrate a twelfth embodiment of the invention, wherein FIG. 17 is a schematic diagram illustrating the main part of a sensing device and FIG. 16 is a side view thereof.

In these figures, similar elements and parts to those in FIG. 7 or 9 are denoted by similar reference numerals, and they are not described here in further detail.

In all previous embodiments, the giant magnetoresistance of the main part of the sensing device is disposed at a predetermined distance apart from the rotary member of magnetic material. In contrast, in this twelfth embodiment, the rotary member of magnetic material is disposed between a magnet and the giant magnetoresistance device of the main part of the sensing device in such a manner that the rotary member of magnetic material is spaced a predetermined distance apart from the magnet and the giant magnetoresistance device.

The main part of the sensing device 50A includes: a housing 70 made up of for example a resin or a non-magnetic material; a cover 71 for protecting a giant magnetoresistance device 57 similar to the above-described giant magnetoresistance device 10, the giant magnetoresistance device 57 being disposed in a cavity 70a inside the housing 70; and a fixing part 74. In the cavity 70a inside the housing 70, there is provided a substrate (not shown) on which a circuit similar to that descried above with reference to FIG. 3 is mounted. The giant magnetoresistance device 57 is mounted on the substrate described above. The giant magnetoresistance device 57 is electrically connected to terminals 72 extending to its bottom portion via the inside of the main part of the sensing device 50A. The other ends of the terminals 72 are connected to input/output lead terminals 73 including a power supply terminal, a ground terminal, and an output terminal, which extend toward the outside for the connection to an external circuit.

A magnet 58 is disposed on the bottom of the space 70b on a side of the housing 70 so that the magnet 58 faces the magnetic field sensing plane of the giant magnetoresistance device 57 disposed in the cavity 70a. The rotary member of magnetic material 52 which is adapted to rotate in synchronization with the rotating shaft 51 is disposed in such a manner that at least its protruding and recessed portions pass through the gap between the giant magnetoresistance device 57 and the magnet 58.

In this arrangement, a magnetic path is formed through the magnet 58, the rotary member of magnetic material 52, and the giant magnetoresistance device 57. When a recessed portion of the rotary member of magnetic material 52 is located between the giant magnetoresistance device 57 and the magnet 58, the magnetic field emerging from the magnet 58 is applied directly to the magnetic field sensing plane of the giant magnetoresistance device 57. On the other hand, when a protruding portion of the rotary member of magnetic material 52 is located between the giant magnetoresistance device 57 and the magnet 58, the magnetic field emerging from the magnet 58 is absorbed into the rotary member of magnetic material 52, and, as a result, substantially no magnetic field is applied to the magnetic field sensing plane of the giant magnetoresistance device 57.

Therefore the above structure has, in effect, the same function as the rotary member of magnetic material 52 at least a part of which is formed with a magnet as in the embodiments described above. As a result, also in this structure, it is possible to start a detecting operation as soon as the electric power is turned on.

Figure 18:
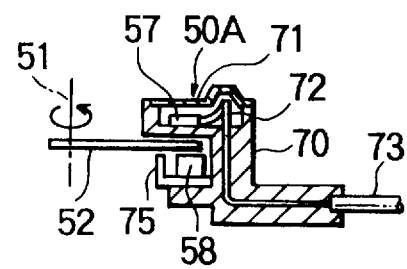
FIG. 18 is a sectional side view illustrating a modified example of the main part of the sensing device based on the sixth embodiment of the invention.

In the specific example described above, the magnet 58 is disposed on the bottom of the space 70b on the side of the housing 70 so that the magnet 58 faces the magnetic field sensing plane of the giant magnetoresistance device 57 disposed in the cavity 70a. However, a core 75 may be further provided between the bottom of the space 70b and the magnet 58 as shown in FIG. 18 thereby forming a magnetic circuit. In this case, a closed magnetic path starting from the magnet 58 and passing through the rotary member of magnetic material 52, the giant magnetoresistance device 57, the rotary member of magnetic material 52, the core 75, and finally ending at the magnet 58 is established. This magnetic circuit leads to an improvement in the reliability of the sensing operation.

Thus, the present embodiment not only provides similar effects to those in the second embodiment described above, but also provides an additional advantage that it is possible to start a sensing operation as soon as the electric power is turned on although the rotary member of magnetic material should be properly positioned between the giant magnetoresistance device and the magnet.

Embodiment 7

Figure 19:
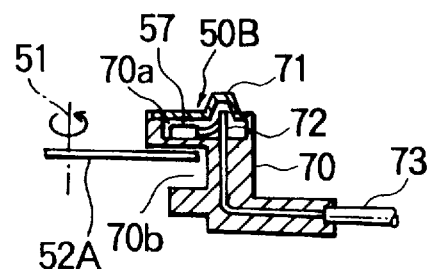
FIG. 19 is a sectional side view illustrating a seventh embodiment of a sensing device according to the present invention.
Figure 20A:
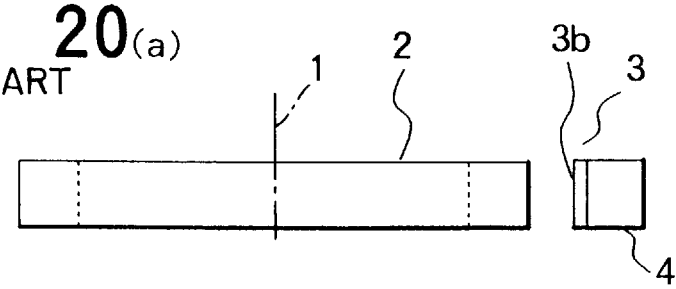
FIGS. 20(a) and 20(b) are schematic diagrams illustrating a conventional sensing device.
Figure 20B:
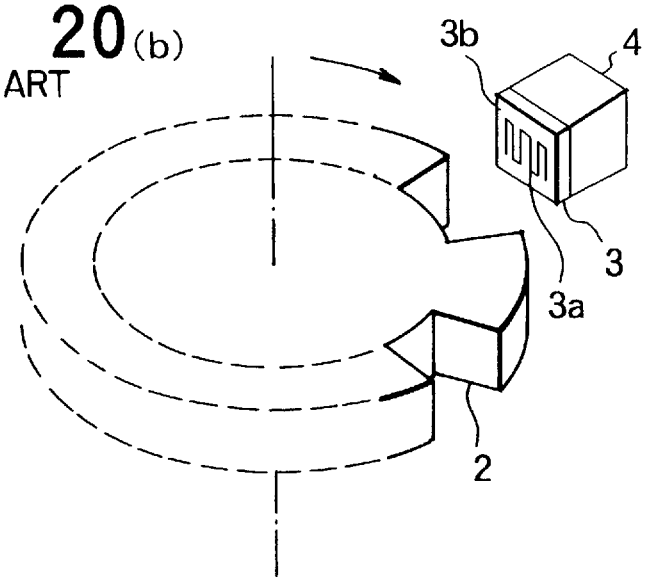

FIG. 19 is a sectional side view illustrating a thirteenth embodiment of the invention.

In FIG. 19, similar elements and parts to those in FIG. 11 or 16 are denoted by similar reference numerals, and they are not described here in further detail.

In the sixth embodiment described above, the rotary member of magnetic material is of a common type having protruding and recessed portions such as that shown in FIG. 7 is employed. Instead, a rotary member composed of magnets (FIG. 11) or a rotary member on which a magnet is mounted (not shown) may also be employed as the rotary member of magnetic material. In this specific embodiment, the rotary member of magnetic material is composed of magnets. In this case, therefore, the magnet 58 employed in the embodiment described above in connection with FIG. 16 is no longer required. The other parts are similar to those of FIG. 16.

In this embodiment, the rotary member of magnetic material 52A is disposed so that at least the peripheral portion of the rotary member of magnetic material 52A passes though the space 70b formed on the side of the housing 70 of the main part of the sensing device 50B and so that the rotary member of magnetic material 52A faces the magnetic field sensing plane of the giant magnetoresistance device 57 disposed in the cavity 70a.

As can be seen from the above description, also in the present embodiment, a magnetic path passing though the rotary member of magnetic material 52A and the giant magnetoresistance device 57 is established, which leads to an improvement in sensing performance. As a matter of course, it also becomes possible to start a sensing operation as soon as the electric power is turned on.

Thus, the present embodiment not only provides similar effects to those in the third embodiment described above, but also provides an additional advantage that the reliability and the performance of the sensing operation are improved.

Embodiment 8

In all the previous embodiments, the moving member of magnetic material serving as the magnetic field variation inducing means is adapted to rotate in synchronization with the rotating shaft. However, the moving member of magnetic material may also be adapted to move along a straight line. Such the moving member can find applications for example in detection of the opening degree of the EGR valve of an internal combustion engine.

In all the previous embodiments, although a giant magnetoresistance device is used as a magnetic field sensing element, another element, for example, a magnetoresistance device capable of detecting a change in the supplied magnetic field may be used.

What is claimed is:

1. A sensing device comprising:
   magnetic field generation means for generating a magnetic field;
   magnetic field variation inducing means for changing the magnetic field generated by said magnetic field generation means, said magnetic field variation inducing means being disposed a predetermined distance apart from said magnetic field generation means;
   magnetic field sensing element for detecting the magnetic field changed by said magnetic field variation inducing means; and
   means for generating a final output signal corresponding to changes in the magnetic field without variation due to changes in operating temperature, wherein said generating means comprises AC coupling processing means for performing an AC coupling process on an output signal of said magnetic field sensing element and means for setting a reference voltage of said AC coupling processing means.

2. A sensing device according to claim 1, wherein said processing means includes a bridge circuit, at least one branch of said bridge circuit comprising said magnetic field sensing element; an amplifying circuit for amplifying the differential output signal of said bridge circuit; an AC coupling circuit for performing an AC coupling process on the output of said amplifying circuit; and means for comparing the output of said AC coupling circuit with a reference voltage.

3. A sensing device according to claim 1, wherein said magnetic field variation inducing means is composed of a moving member of magnetic material provided with at least one protruding or recessed portion.

4. A sensing device according to claim 1, wherein said magnetic field generation means and said magnetic field variation inducing means are formed into a moving member of magnetic material provided with at least one magnetic pole so that said moving member of magnetic material generates a magnetic field and changes said magnetic field.

5. A sensing device according to claim 3, wherein said moving member of magnetic material is a rotary member which rotates in synchronization with a rotating shaft.

6. A sensing device according to claim 4, wherein said moving member of magnetic material is a rotary member which rotates in synchronization with a rotating shaft.

7. A sensing device according to claim 5, including a main part of the sensing device provided with at least said magnetic field sensing element, said rotary member being mounted on a crank shaft or a cam shaft on an internal combustion engine, said main part of the sensing device being disposed adjacent to said internal combustion engine so that said rotary member faces said magnetic field sensing element.

8. A sensing device according to claim 6, including a main part of the sensing device provided with at least said magnetic field sensing element, said rotary member being mounted on a crank shaft or a cam shaft on an internal combustion engine, said main part of the sensing device being disposed adjacent to said internal combustion engine so that said rotary member faces said magnetic field sensing element.

9. A sensing device according to claim 5, wherein said main part of the sensing device is disposed at a location shifted from said rotary member in a direction along the rotation axis of the rotating shaft.

10. A sensing device according to claim 6, wherein said main part of the sensing device is disposed at a location shifted from said rotary member in a direction along the rotation axis of the rotating shaft.

11. A sensing device according to claim 9, wherein said main part of the sensing device includes a housing in which at least said magnetic field sensing elements are disposed, and said rotary member is disposed in a space on a side of said housing in such a manner that at least the periphery of said rotary member faces said magnetic field sensing element.

12. A sensing device according to claim 10, wherein said main part of the sensing device includes a housing in which at least said magnetic field sensing elements are disposed, and said rotary member is disposed in a space on a side of said housing in such a manner that at least the periphery of said rotary member faces said magnetic field sensing element.

* * * * *